United States Patent [19]
Denardo et al.

[11] Patent Number: 6,018,716
[45] Date of Patent: Jan. 25, 2000

[54] APPARATUS AND METHOD FOR ANALYSIS OF CONTINUOUS PROCESS LINES

[75] Inventors: Patrick F. Denardo, Endicott; Philip D. Heinlein, Binghamton; Timothy J. Maguire, Vestal; David J. Wolstromer, Endwell, all of N.Y.

[73] Assignee: International Business Machines Corporation, Armonk, N.Y.

[21] Appl. No.: 08/889,550

[22] Filed: Jul. 8, 1997

Related U.S. Application Data

[63] Continuation of application No. 08/234,908, Apr. 28, 1994, abandoned.

[51] Int. Cl.⁷ ........................................... G06F 17/60
[52] U.S. Cl. .................. 705/7; 705/11; 364/468.03; 364/468.12; 364/468.15
[58] Field of Search .................... 705/1, 7, 8, 9, 705/11; 364/468.01, 468.02, 468.03, 468.05, 468.09, 468.1, 468.15, 468.16, 468.18, 468.12

[56] References Cited

U.S. PATENT DOCUMENTS

| | | |
|---|---|---|
| 4,760,606 | 7/1988 | Lesnick et al. . |
| 4,884,217 | 11/1989 | Sheirik et al. . |
| 4,907,167 | 3/1990 | Sheirik . |
| 4,910,691 | 3/1990 | Skeirik . |
| 4,965,742 | 10/1990 | Skeirik . |
| 5,006,992 | 4/1991 | Skeirik . |
| 5,008,805 | 4/1991 | Fiebig et al. . |
| 5,216,592 | 6/1993 | Mann et al. . |
| 5,381,332 | 1/1995 | Wood .................................... 364/401 |

FOREIGN PATENT DOCUMENTS

| | | |
|---|---|---|
| 0527596 | 6/1992 | European Pat. Off. . |
| 4062603 | 2/1992 | Japan . |
| 9112583 | 8/1991 | WIPO . |

OTHER PUBLICATIONS

Bowers, Jr.; "Continuous Flow Manufacturing"; *1990 Int'l Semiconductor Manufacturing Science Symposium*; pp. 4–8.

Aiken et al.; "ESP: An Expert System for Pre–Session Group Decision Support Systems Planning"; *System Sciences*, 1990 Annual Hawaii Int'l. Conference; 1990; pp. 279–286.

Luo et al.; "A Framework of Database Design for Group Decision Support Systems"; *Database Technology*; v4 n4; 1991–1992; pp. 195–208.

(List continued on next page.)

*Primary Examiner*—Stephen R. Tkacs
*Attorney, Agent, or Firm*—Douglas M. Clarkson

[57] ABSTRACT

A network computer system and method for analyzing a system of continuous process lines. Groupware is used to implement the analysis stage of continuous flow manufacturing (CFM) methodology using a network of portable computers. Preferably in one meeting, in response to prompts of a facilitator, participants input all the required qualitative and quantitative data about each process line in the system being analyzed. The input data is anonymously displayed to all the participants, the data is corrected and verified by group consensus achieved informally or by automatic tabulation of anonymous voting as needed. The verified data is organized into a GroupWare database (flat files and/or a part of a relational database). Bridge programs automatically read the GroupWare database and reorganize the data to create a program input database. Then preferably in the same meeting a flow chart program (e.g. a computer aided design CAD system) is used to generate flow charts for each process line from the program input database and a report program (e.g. the report module of a database management system) is used to generate data sheets for the process steps from the program input database. The flow charts and data sheets are corrected and revised until verified by group consensus. Thus, the analysis of a system of continuous processes can be performed in one or at least in a small number of group meetings over a much shorter elapsed time.

8 Claims, 16 Drawing Sheets

OTHER PUBLICATIONS

Helliwell; "Computer Collaboration Tools Emerge, Categories to Follow"; *PC Week*; v4 n22; pC1(2); Jun. 2, 1987; Dialog: File 148, ACC# 03163899.

Dialog Abst5ract: FIle 148, Acc# 02341745; Johnstone et al.; "Flow Reviews Systematically Improve Manufacturing Process Logistics"; *Industrial Engineering*; v19 n12; p40(3); Dec. 1987.

Singh; "Using CFM as a Competitive Edge"; *Automation*; v37 n36; p64(2); Jun. 1990; Dialog: File 148, Acc# 04601159.

Higgins; "Ventana Updates Meeting Software for NeWare 386"; *PCWeek*; v 8 n28; p48(1); Jul. 15, 1991; Dialog: File 148, Acc# 05408634.

News Release; Dateline: tuscon, AZ; Jan. 31, 1992; Ventana Corporation Introduces GroupSystems V: The Industry's First Distributed Group–Productivity Software System; Dialog: File 621, Acc# 0319544.

"Groupware Transforms the Meeting Process"; *T H E Journal*; v19 n8; pS48(1); Mar. 1992; Dialog: File 275, Acc# 01522872.

Bergstrom; "You Should Know What IBM Knows"; *Production*; v104 n3; p50(6); Mar. 1992; Dialog: File 148, Acc# 05878707.

Olsen; "Electronic Meetings Save Army Big Bucks on Travel"; *Government Computer News*; v11 n8; p27(2); Apr. 13, 1992; Dialog: File 275, Acc# 01513145.

Gallupe et al.; "Facilitated Electronic Meetings: Higher Quality, Less Time"; *CMA—The Management Accounting Magazine*; v66 n3; p29(4); Apr. 1992; Dialog: File 148, Acc# 905919789.

Hitchcock; "Taking the Right Steps to the Top"; *Modern Materials Handling*; v47 n12; p40(5); Oct. 1992; Dialog: File 148, Acc# 06168352.

Cavaretta; "Computer–Aided Decisions"; *Association Management*; v44 n12; p12(2); Dec. 1992; Dialog: File 148, Acc# 06215343.

Dialog Abstract: File 15, Acc# 00610921; Anonymous; "Making the Production Line More Productive"; *IBM Directions*; v6 n1; pp. 20–25; Winter 1992.

Donelan; "Using Electronic Tools to Improve Meetings"; *Management Accounting*; v74 n9; pp. 42–45; Mar. 1993; Dialog: File 15, Acc# 00678312.

Rasmus; "Learning the Waltz of Synthesis"; *Manufacturing Systems*; v11 n6; pp. 16–23; Jun. 1993; Dialog: File 15, Acc# 00713060.

Laplante; "'90s Style Brainstorming"; *Forbes*; Oct. 25, 1993; p. S–44; Dialog: File 16, Acc# 04679994.

IBM Technical Disclosure Bulletin vol. 36, No. 2, Feb. 1993, pp. 3–10, "Robust Automatic Flow Control For High–Speed Data Transmission", by Hall et al.

IBM Technical Disclosure Bulletin vol. 33, No. 3A, Aug. 1990, pp. 419–423, "High Speed System I/O Bus Used To Connect A Processor To Multiple I/O Bus Controller Chips", by Bailey et al.

APPARATUS AND METHOD FOR ANALYSIS OF CONTINUOUS PROCESS LINES

This is a continuation of Ser. No. 08/234,908 filed Apr. 28, 1994 now abandoned.

This patent is protected by copyright except to the extent required by law in order to obtain and continue all available patent protection during the term of the patent.

The inventions of applicants relate to apparatus and methods for analyzing processes and more specifically to analysis of complex continuous process in order to document and reach a relatively complete understanding of the process.

BACKGROUND

IBM developed the Continuous Flow Manufacturing (CFM) methodology in the mid-1980's and has applied the methodology in IBM manufacturing facilities since that time. Although originally designed for manufacturing processes, the methodology can be applied to any continuous process. IBM also offers CFM as a consulting service under the name CFM-Short Cycle™. CFM includes the following steps:

1. Understand current operations
2. Set goals for improvements
3. Implement improvements
4. Continuous improvements (i.e. repeat the process continuously)

CFM line analysis is used to achieve the first step which is understanding the system. One of the basic principles of CFM is that the process experts are the people who work day-to-day with the process. CFM line analysis uses structured group work meetings lead by an experienced facilitator to help these experts translate their knowledge and common sense into a description of the system.

Referring to FIG. 1, ideally the process follows this path, but occasionally where information which is not available in a meeting is required or when not enough time is scheduled, additional scheduling and meeting steps may be required. In step 102, a team of persons who know the process and who would work well together in a working meeting are selected. Then in step 104 a meeting is scheduled with the facilitator and participants. In the meeting, in step 106, the participants define the scope of the process. The scope describes where the inputs of the process come from i.e. the suppliers, what happens to the inputs during the groups part of the process, and where the products go at the end of the process i.e. the customers.

In step 108, each step of the process is described and the relation to other steps in the process determined. These are referred to as process flows. The process flows (there may be several modes) are typically drawn on a black-board or flipchart and are typically redrawn and marked up several times before the group is satisfied that the process is represented correctly. This is the qualitative phase of the analysis.

The discussion of process flow usually triggers an outpouring of ideas (brain storming) from the team, including both problems that need solution and ideas that might improve the process which we call opportunities. The evaluator discourages criticism or other evaluation of the opportunities to promote participation and because the meeting can easily be consumed by evaluation. Therefore the opportunities must be recorded immediately for later evaluation.

In step 110, data sheet forms are prepared by the facilitator after the meeting. Typically there are three types of data sheet forms: operation/setup time, transport time, and capacity. For example, three types of data sheets and the column headings are listed for an analysis of a continuous card assembly manufacturing process.

Operation/Setup Time
  panel size
  activity
  setup or operation
  mode time
  comment or technology examples
  minimum time
  comment or technology examples
  maximum time
  comment or technology examples
Transport Time
  output form
  transport to
  transport time
  transport frequency (hours)
  transport lot size
  comments
Capacity
  Type (buffer, operation, or transport)
  quantity
  maximum size/capacity each
  typical batch size/inventory
  time available (per day)
  mean time to fail
  mean time to repair
  comments In step 112, the facilitator also prepares a clean copy of the process flows. In steps 114 and 115 the facilitator distributes a copy of the forms and process flows respectively to each member of the team; and in step 116, each team member makes corrections to the process flows and fills out the forms for all the process steps. Step 116 can take several days or even weeks.

In step 118, the facilitator collects the corrections to the process flows and collects the forms. In decision step 120, if there are no corrections to any of the process flows then the process flows are considered validated. Otherwise in step 122, a team meeting is scheduled. In step 124 the team reaches a consensus for the process flows. In decision step 126, if there are changes to the process flows then steps 110 through 120 have to be repeated. Otherwise, the process flows are considered valid.

In step 122, a meeting is scheduled to resolve differences in data sheet input. In step 124 a meeting is held which resolves such differences. Then is step 126 a final version of the process flows and data sheets is prepared. In step 128 the data is analyzed and opportunities are evaluated to determine changes which will maximize benefit to the quality, efficiency and speed of the manufacturing line as a whole. In step 130, goals are set for improvements, and in step 132, improvements are implemented. The entire process should be occasionally repeated to maintain continuous improvements to the system.

Typically CFM line analysis performed as described above takes 4 to 8 weeks to complete. The time is consumed by repeated sessions to capture more and better data, and by the manual techniques of compiling, distributing and collecting data outside of meetings.

In the late 1980's several application programs were developed to allow groups of people to work together by sharing information. These applications are referred to as GroupWare. GroupWare products run on a mainframe computer or on a network so that users can communicate in real time. Most GroupWare products provide one or more of the following functions:

- calendar coordination;
- electronic mail;
- shared document word processing;
- shared database management;
- document control; and
- group decision support (e.g. voting).

For example, Ventana Corporations markets System V, International Business Machines corporation markets TeamKit®, LOTUS markets LotusNotes®.

TeamKit® offers anonymous email, an email composing editor, and supports group decision making by automatically tabulating anonymous voting.

There are a multitude of applications programs available for creating, editing, and printing flow charts for example ALL CLEAR.

Japanese patent JP 04-293157 describes a GroupWare application.

OBJECTS OF THE INVENTION

It is an object of this invention to reduce the time between from the beginning of the line analysis of a continuous process until the completion of the analysis.

It is also an object to reduce the risk of mis-recording information shared in a continuous process analysis team meeting.

Another object of this invention is to encourage participation by team members in analysis meetings to reduce the risk that important information will not be shared.

Finally, it is an object of the invention to reduce the time required (man hours) to perform line analysis of a continuous process.

SUMMARY OF THE INVENTION

The inventions of applicants include identification of problems with manual methods of CFM line analysis and solutions to these problems which facilitate fast, accurate line analysis of a continuous processes.

This invention provides a more efficient means of capturing data generated in a CFM group meeting and bridge apparatus for automating the conversion of the input data into flow charts and data sheets. The bridge apparatus converts files created by an existing group ware software products into: the format of files for existing computer aided drafting software products to produce flow charts; and into the format of files for existing database products for generating data sheets. Instead of waiting days or weeks the entire process can be accomplished in one or possibly a few group meetings.

In manual methods for participating in working meeting, participation is hampered by the requirement of sequential communication and fear of making embarrassing mistakes in a group setting. Decision making is hampered by personal accountability for publicly taken positions. GroupWare is used to overcome these problem by providing concurrent entry of information by multiple participants and anonymous entry of information, and decision making by anonymous voting.

BRIEF DESCRIPTION OF THE DRAWINGS

These and other objects, features, and advantages of the inventions of applicants will be more fully understood with reference to the accompanying figures and following descriptions thereof.

DESCRIPTION OF SPECIFIC EMBODIMENTS INCLUDING THE BEST MODE FOR CARRYING OUT THE INVENTIONS

Figure 1A:
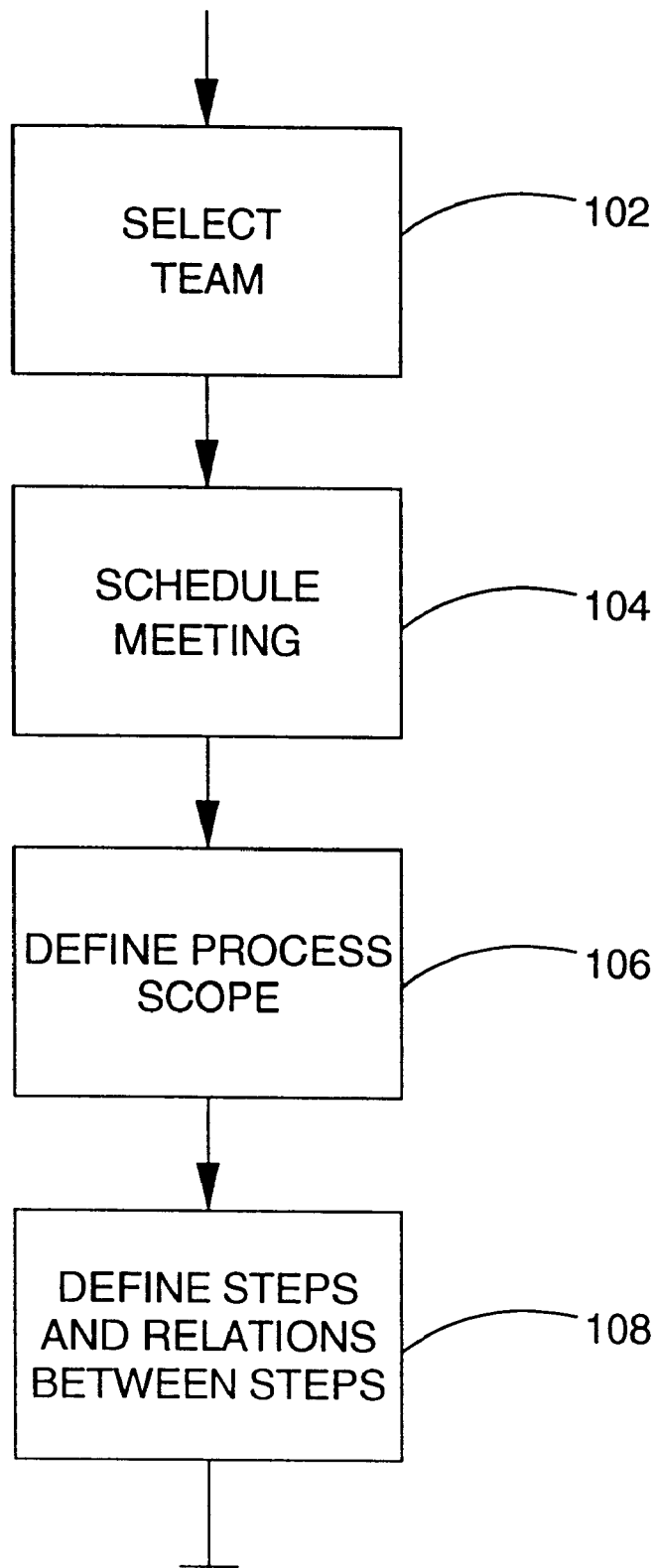
FIG. 1, composed of FIGS. 1A, 1B and 1C, is a flow chart depicting an example of a manual process for performing line analysis of a continuous process.
Figure 1B:
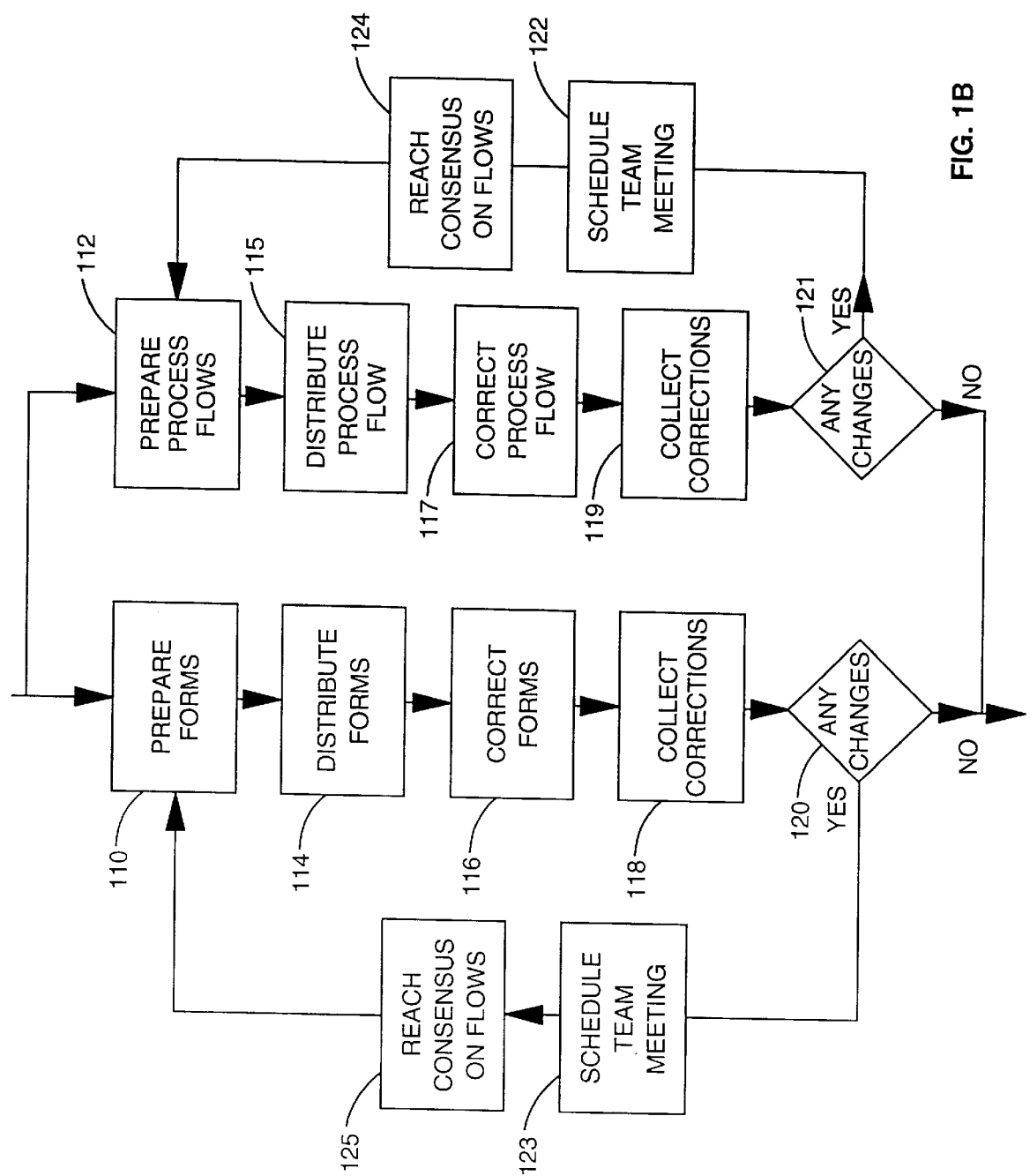
Figure 1C:
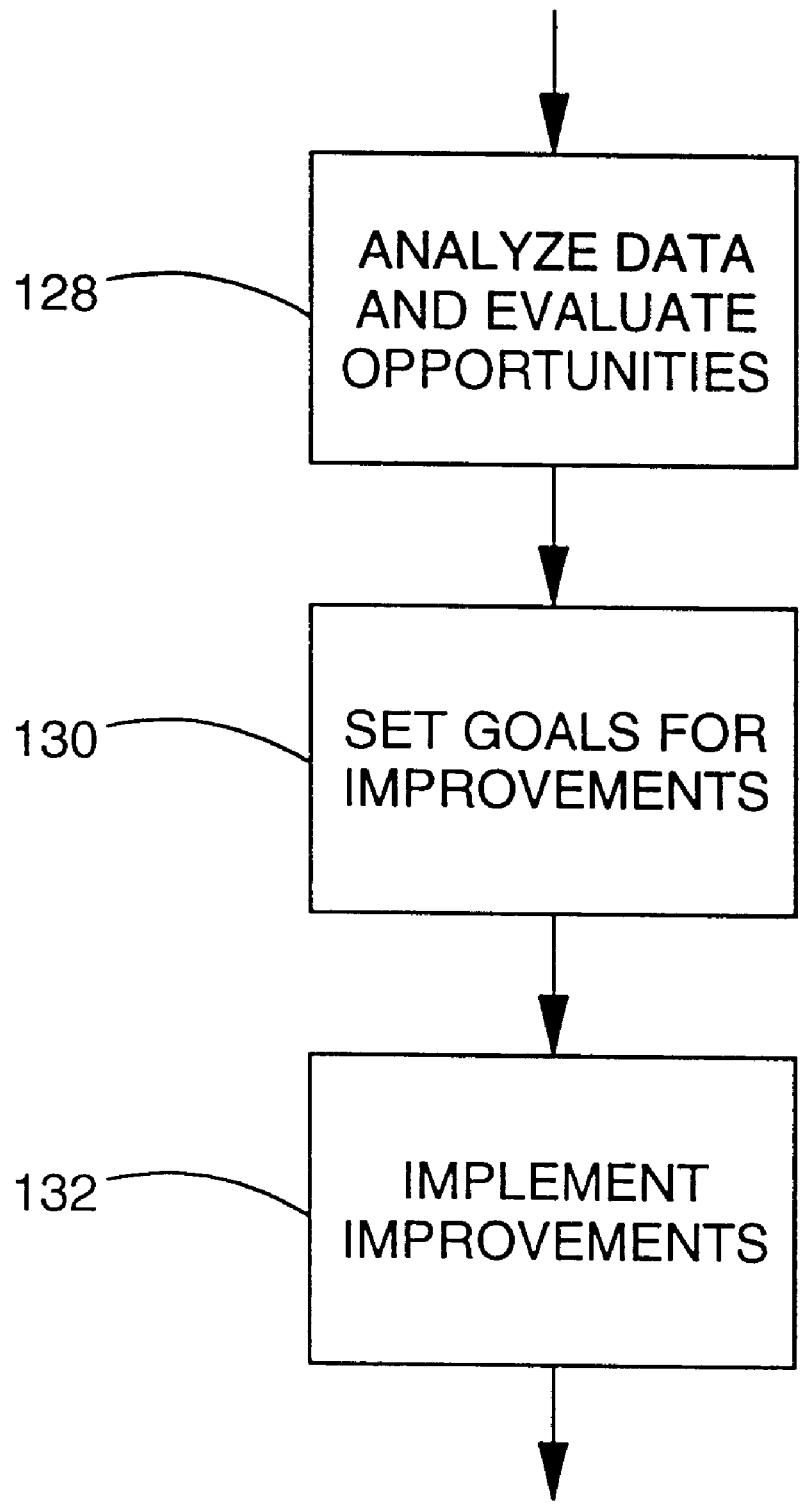

FIG. 1 is described in the background. Although FIG. 1 is used herein for background purposes, applicant is not aware of any prior art which enables the manual system, as its illustrated in FIG. 1 and described in the background section of this application, prior to the invention of applicants described herein.

Figure 2:
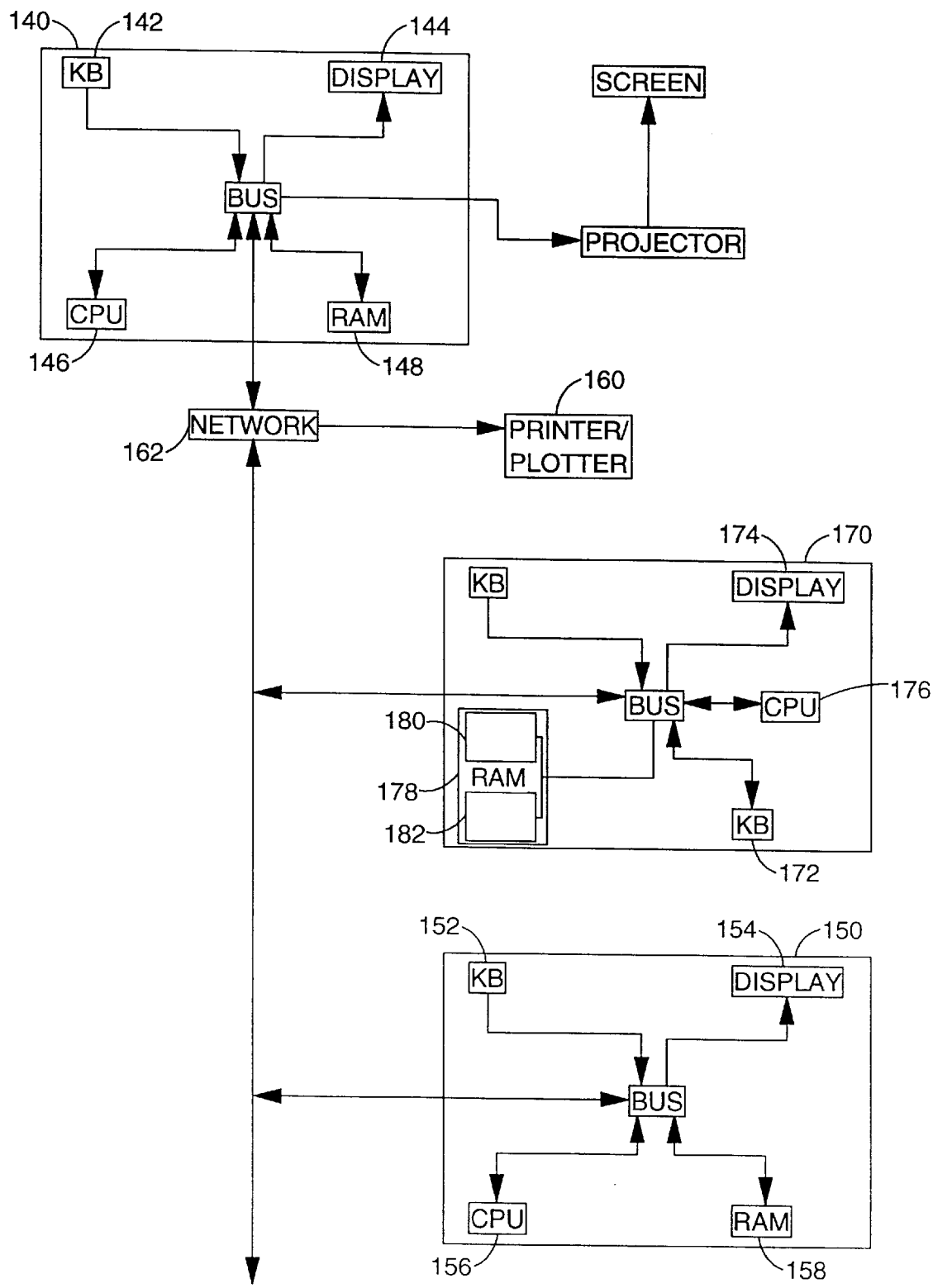
FIGS. 2 and 3 (including 3A–3D) are block diagrams showing a specific embodiment of the apparatus of the invention.
Figure 3A:
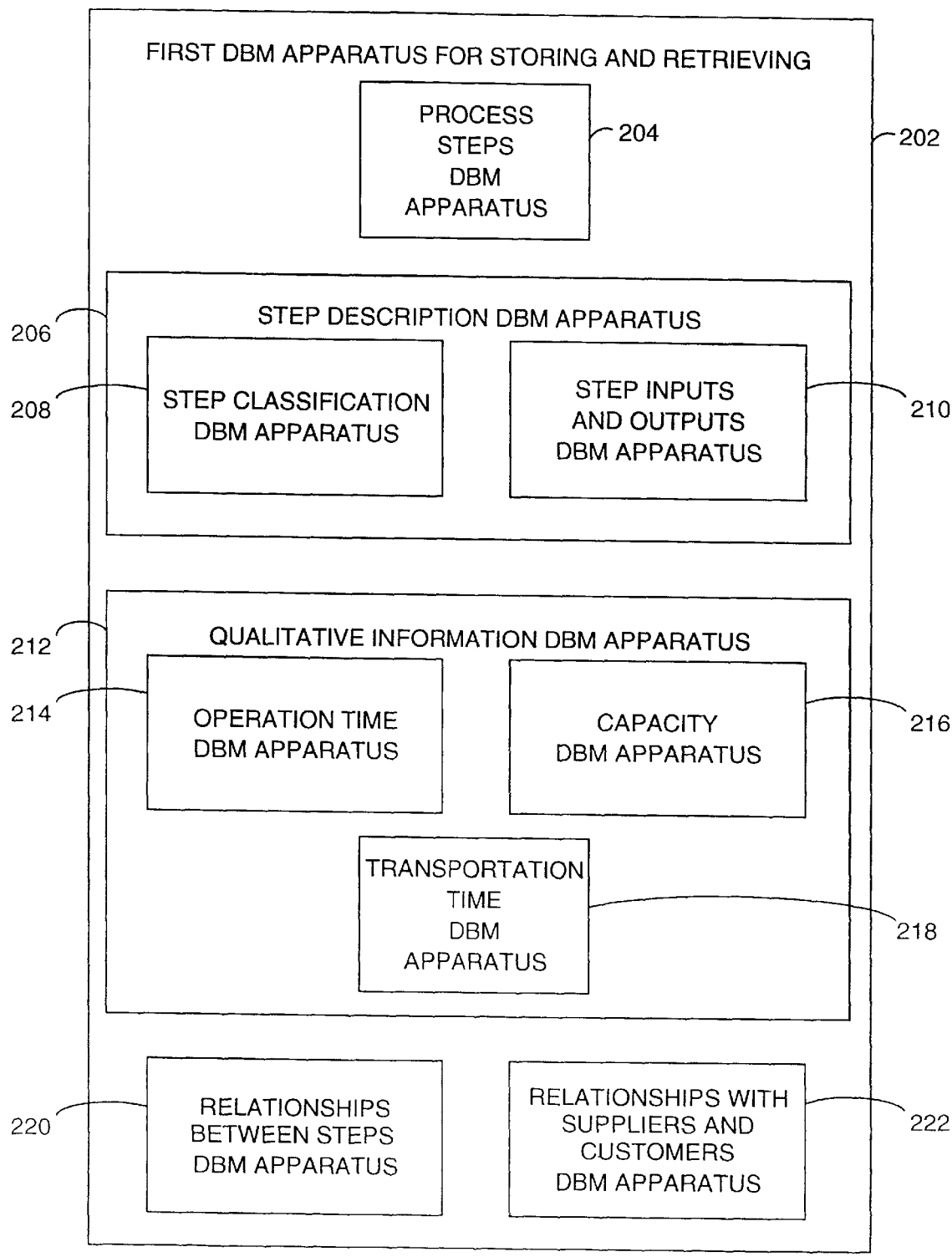
Figure 3B:
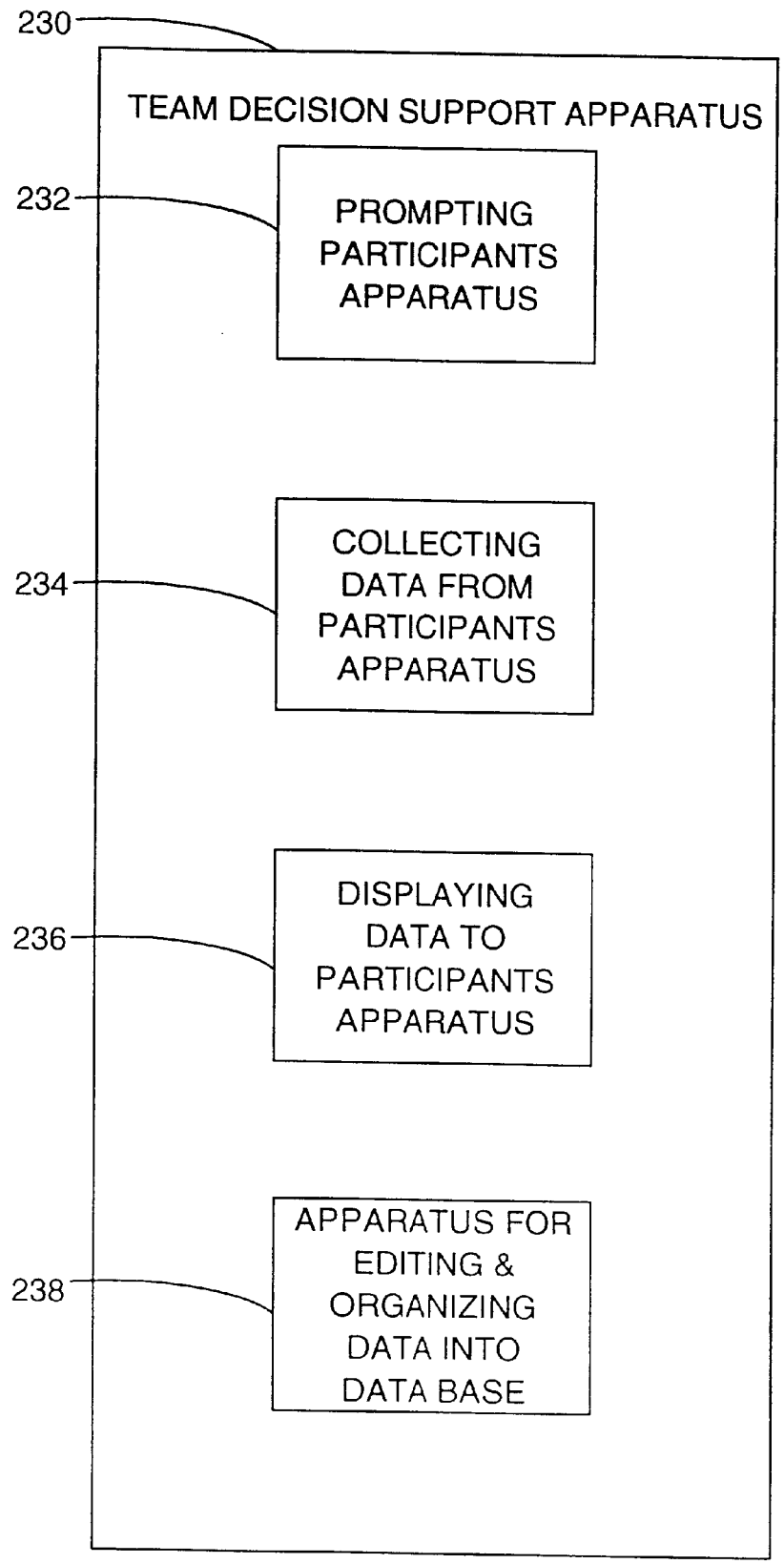
Figure 3C:
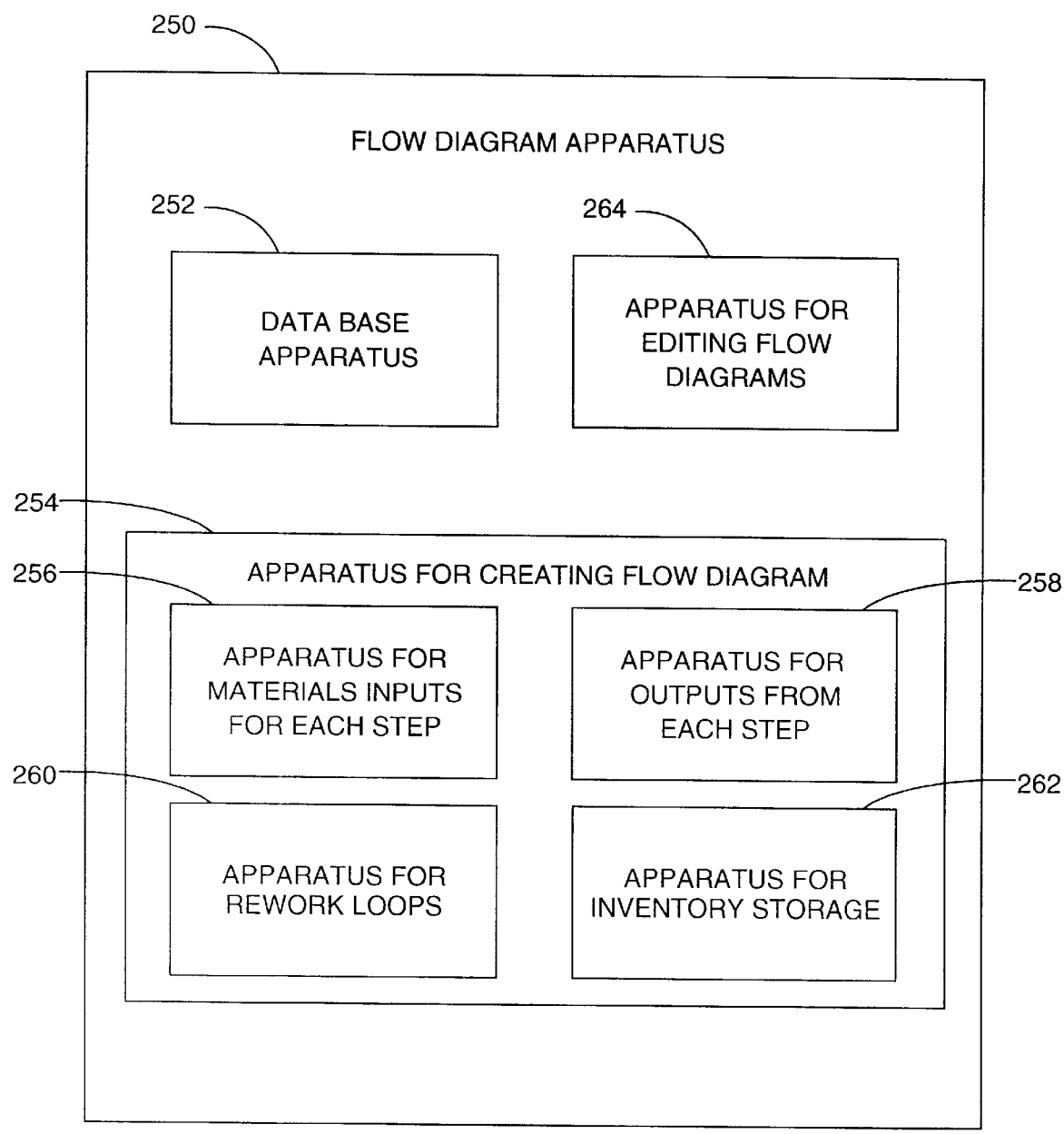
Figure 3D:
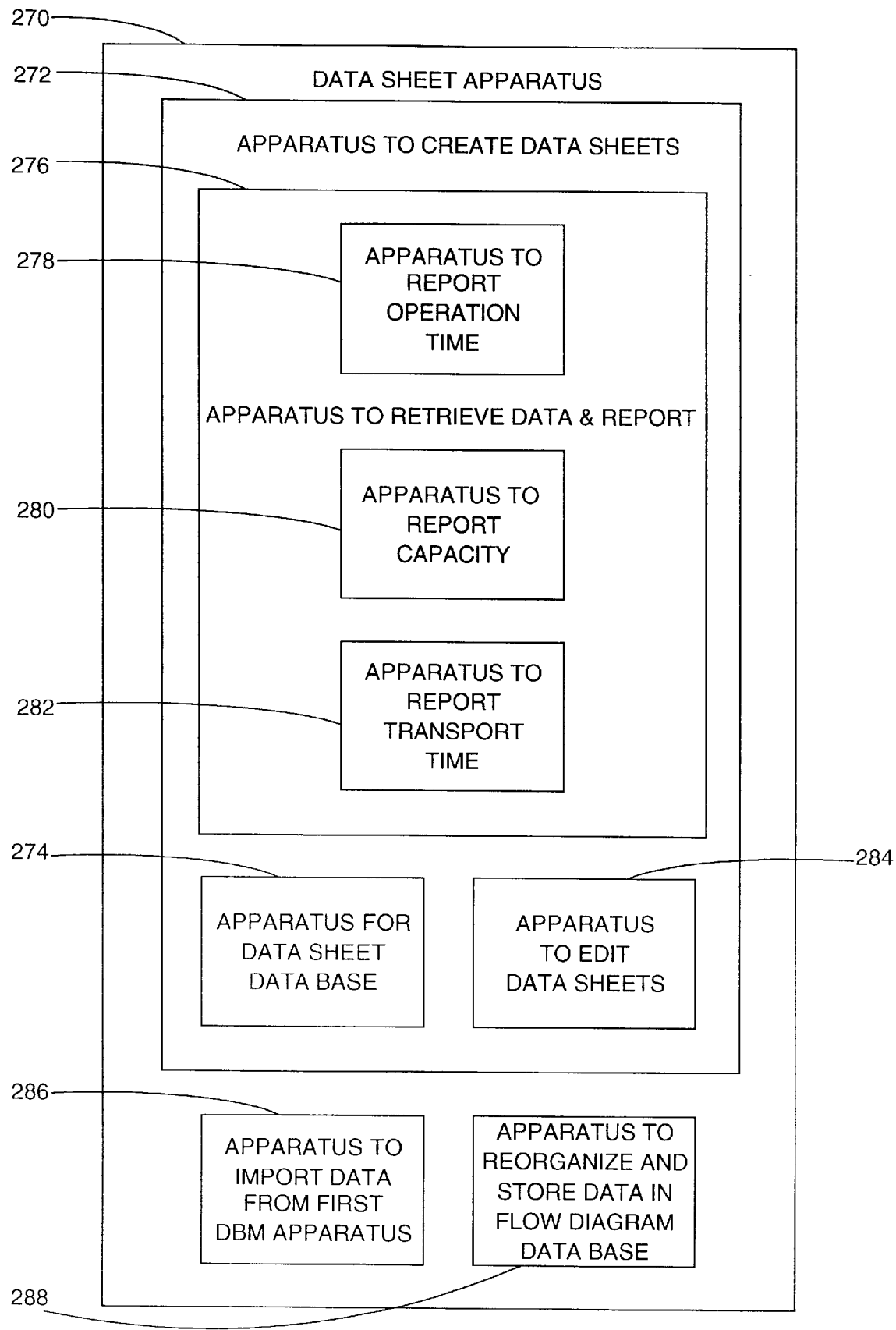

FIG. 2 is a schematic of the apparatus of the system for performing line analysis of a continuous process. Portable facilitator workstation 140 includes apparatus for data input such as a mouse or keyboard 142, a display such as an active matrix color LCD display 144, at least one central processing unit (CPU) 146, and hardware to direct the CPU to perform the functions of the process of the invention such as random access memory (RAM) 148 communicating with the CPU, which can be configured as apparatus to control the CPU and to control other functions of the workstation. The keyboard, display, CPU, and RAM are interconnected for example by at least one bus.

A multitude of portable participant workstations 150 include apparatus for data input such as a mouse, pen, and/or a keyboard 152, a display such as a CRT or preferably an active matrix color LCD display 154, at least one central processing unit (CPU) 156, and hardware to control the CPU such as read only memory ROM or preferably random access memory (RAM) 158 which communicates to control the CPU and which can be configured as apparatus to control the CPU and other functions of the workstation.

The keyboard, display, CPU, and RAM communicate for example by being interconnected by at least one bus.

A device for producing output such as a printer, floppy disk, or connection to an external database must be provided to permanently save the results of the session. Preferably paper output is produced by providing a plotter for flow charts and a text printer for text. More preferably a laser printer 160 produces both text and diagrams on paper or other sheet material. Computer network 162 connects facilitator workstation 140, printer 160, and all participant workstations 150 together. The network can be electrical, optical, and/or by broadcast.

Apparatus to display the information to the entire group (the facilitator and all the participants) is preferred. Screen 164 is sufficiently large and positioned to provide viability of several thousand characters of text displayed on the screen by all the participants in the meeting (i.e. from each of the participant workstations). Projector 166 is connected to the facilitator workstation or otherwise to the network, and positioned with respect to the screen to project an image which can preferably be seen from the workstations 150. Preferably the image is the same image as on the facilitator display.

Preferably, Portable network server computer 170 is provided to control the network and store programs and data required in the session. The server may also include keyboard 172 for data entry (i.e. input) and active matrix color LCD display 174. The server includes at least one CPU 176, and RAM 178. The keyboard, display, and hardware to control the CPU such as RAM which communicates to control the CPU for example through at least one bus. The RAM can be configured as apparatus to control the CPU and other functions of the workstation, including: RAM 180 configured to control the functions of the server; and RAM 182 configured to control the flow of information between the facilitator workstation, the laser printer, and the participant workstations over the network. Although, control programs described herein can be implemented purely in permanent hardware such as ROM or even discrete components, configuring RAM is much preferred since programming RAM is much simpler than designing and producing hardware.

FIG. 3 schematically shows further apparatus to control the system. Preferably the apparatus is RAM which may be either a part of the server or a part of one or more of the workstations or both in some combination.

The RAM includes a first database management (DBM) apparatus 202 (flat files or preferably a relational database) for storing and retrieving information. The DBM apparatus includes apparatus 204 for storing and retrieving multiple process steps of multiple process lines. The DBM apparatus may also include apparatus 206 for storing and retrieving qualitative descriptions related to each respective process step and preferably including apparatus 208 for storing and retrieving a classification indicating the step is either an operation, transportation, inventory storage, or inspection step; and apparatus 210 for storing and retrieving material inputs, and product outputs of each operation step.

DBM apparatus 202 may also include apparatus 212 for storing and retrieving quantitative information related to each process step preferably including apparatus 214 for storing and retrieving operation time data, apparatus 216 for storing and retrieving capacity data, and apparatus 218 for storing and retrieving transportation time data. The DBM apparatus preferably also includes apparatus 220 for storing and retrieving the relationships between the process steps; and apparatus 222 for storing the retrieving relations between each process line and suppliers and customers for that line.

The RAM also includes team decision support (TDS) apparatus 230 which communicates with DBM apparatus 202. The TDS apparatus preferably includes: apparatus 232 for prompting participants to input data, which appears on the displays of participant workstations, and for transmitting input data after editing by the entering participant; apparatus 234 for collecting data transmitted from participant workstations; and/or apparatus 236 for anonymously displaying the data on the facilitator workstation, on the screen, and on every participant workstation. The TDS apparatus may also include apparatus 238 for editing and organizing data received from participant workstations at the facilitator workstation and storing the input data in the DBM apparatus.

The RAM preferably includes flow diagram (FD) apparatus 250 for producing graphical FDs for a process. The FD apparatus preferably includes: storage apparatus such as a flat file or preferably relational FD database apparatus 252 for storing and retrieving input data for creating flow diagrams. The FD apparatus also includes FD creation apparatus 254 to retrieve input data from the FD database apparatus and to represent multiple process steps and the relationships between process steps, and preferably including: apparatus 256 for representing materials inputs to a process step; apparatus 258 for representing outputs from a process step; apparatus 260 for representing rework loops in the process, and apparatus 262 to represent inventory storage. Finally, apparatus 250 preferably includes apparatus 264 to edit the FD input data in the FD database apparatus for making revised FDs. Preferably this is done locally within the flow charting program without revising the input data in the first database apparatus.

Finally, the RAM preferably includes bridge apparatus 270 for interconnecting DBM apparatus 202, TDS apparatus 230, FD apparatus 250, and for creating data sheets (DSs).

The bridge apparatus preferably includes DS apparatus 272 to automatically create data sheets, and which includes DS database apparatus 274 for storing and retrieving input data for creating data sheets. The DS apparatus also preferably includes DS creation apparatus 276 to retrieve input data from the data sheet database apparatus, and to report a sequence of multiple process steps, and to report quantitative data for a plurality of the process steps. The DS creation apparatus preferably includes: apparatus 278 to report an operation time for a process step; apparatus 280 to report capacity for a process step; and apparatus 282 to report a transportation time for a process step. Finally, the DS apparatus preferably includes apparatus 284 to edit the DS input data in the DS database apparatus for making revised DSs. Preferably this is done locally without revising the input data in the first database apparatus.

Bridge apparatus 270 also preferably includes: DS import apparatus 286 for retrieving input data for producing DSs from first database apparatus 202 and for reorganizing the DS input data and for storing the reorganized data into the DS database apparatus 274; and apparatus 288 for retrieving input data for producing FDs from first database apparatus 202 and for reorganizing the FD input data and storing the reorganized input data in FD database apparatus 252.

Figure 4:
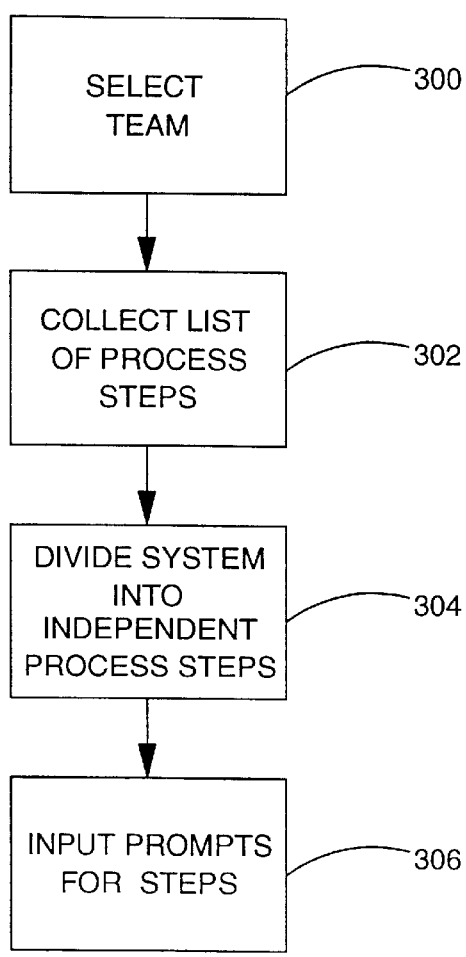
FIGS. 4, 5A, 5B and 6 are flow diagrams of a specific embodiment of the automated computer method of the invention.

FIG. 4 shows a flow diagram of steps of a specific process embodiment of the invention which are preferably conducted before initiating a group meeting. In step 300, a team of participants are selected. Preferably participants are selected who will work well together in an automated meeting environment and who will provide sufficient group knowledge for analyzing a continuous process system are selected. In step 302, preliminarily data including a list of process steps may be collected from one or more members of the team and is input into a computer database for display in the team meeting before the meeting initiates. In step 304, the process system is divided up into one or more independent process lines for analysis. This allows separate meetings to be scheduled for each process line. In step 306 prompts may be input prior to the meeting for collecting data on a preliminary list of process steps during the team meeting.

Figure 5A:
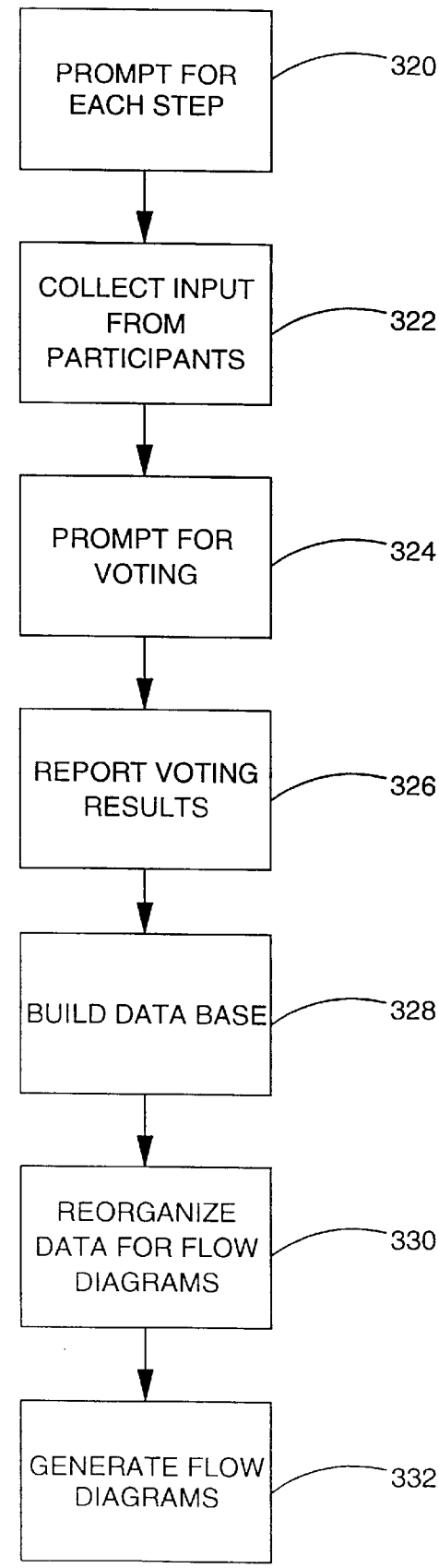

FIG. 5a shows a flow diagram of steps performed during group meetings to generate flow diagrams in a specific embodiment of the process of the invention. These steps are performed for each independent process line in one or more group meetings.

In step 320, participants in the meeting are prompted to input data describing multiple process steps and relations between the steps. In step 322, input data is automatically collected from participants and displayed to the facilitator and to all the participants. Preferably the input is anonymous so that participation is encouraged. In step 324, the participants are prompted to vote in order to verify the input data and reach consensus on inconsistencies in the input data. In most cases, consensus is reached informally because nobody objects to the input data, but in case there is divisiveness, preferably the participants can vote electronically and more preferably the voting is or can be anonymous. In step 326, voting data is automatically collected, and results are reported to all the participants in order to reach consensus with respect to inconsistent input data. Steps 320 through 326 are repeated until the qualitative data is verified for a process line.

In step 328, an editor is used for building a first computer database from the input data, which describes each step in the process, relationships between steps, and the quantitative data related to the steps. The database could be a flat file or preferably a relational or hierarchial database. In step 330, input data is automatically retrieved from the first database, reorganized, and stored into input files for a producing a flow diagram. Step 330 is only required where the files of the editor are in a incompatible format from the files of the flow charting program. In step 332, a flow diagram is automatically generating for the process line from the flow diagram input files, showing process steps and relationship between process steps and the process flow diagrams are presented to the participants.

Figure 5B:
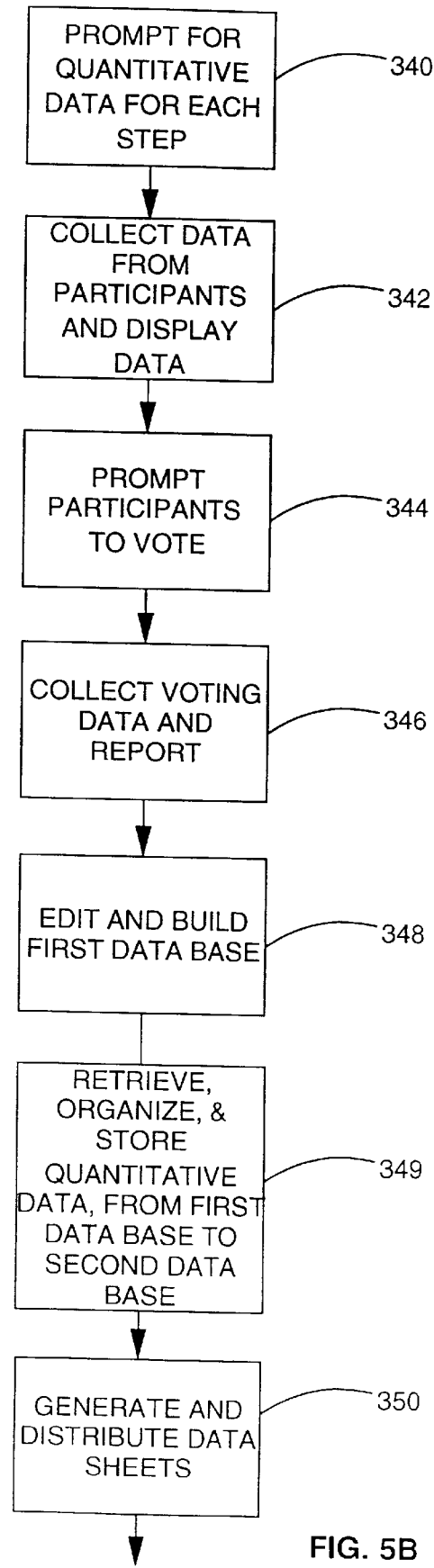

FIG. 5b shows a flow diagram of steps performed in one or more group meetings to generate data sheets in a specific embodiment of the process of the invention. These steps are perform for each step of each independent process line.

In step 340, participants in the meeting are prompted to input quantitative data for each process step in a process line. In step 342, input data is automatically collected from participants and displayed to the facilitator and to all the participants. Preferably it is anonymously displayed (not even the facilitator can determine who input a specific input data) and its displayed on a group display near the facilitator and each participant may optionally choose to display all the input on his participant workstation. In step 344, the participants are prompted to vote in order to verify the input data and reach consensus on inconsistencies in the input data. The prompt may be electronic and appear on each workstation display. If former voting is required to reach consensus on a particular matter then in step 346, voting data is automatically collected, and results are reported to all the participants in order to reach consensus with respect to inconsistent input data. Steps 340 through 346 may be repeated until the qualitative data is verified for a process line.

In step 348, an editor is used for building a first computer database from the quantitative input data. The database may be just flat files or they may be organized as a relational or hierarchial database. If the file format of the editor is incompatible with the file format of the data sheet generation program, then in step 350, quantitative input data is automatically retrieved from the first database, reorganized, and stored in the files of a second database for creating data sheets. The second data base may be just flat files or preferably is a relational database. In step 352, data sheets are automatically generating for the process line from the files of the second database, and the data sheets are presented to the participants.

Figure 6:
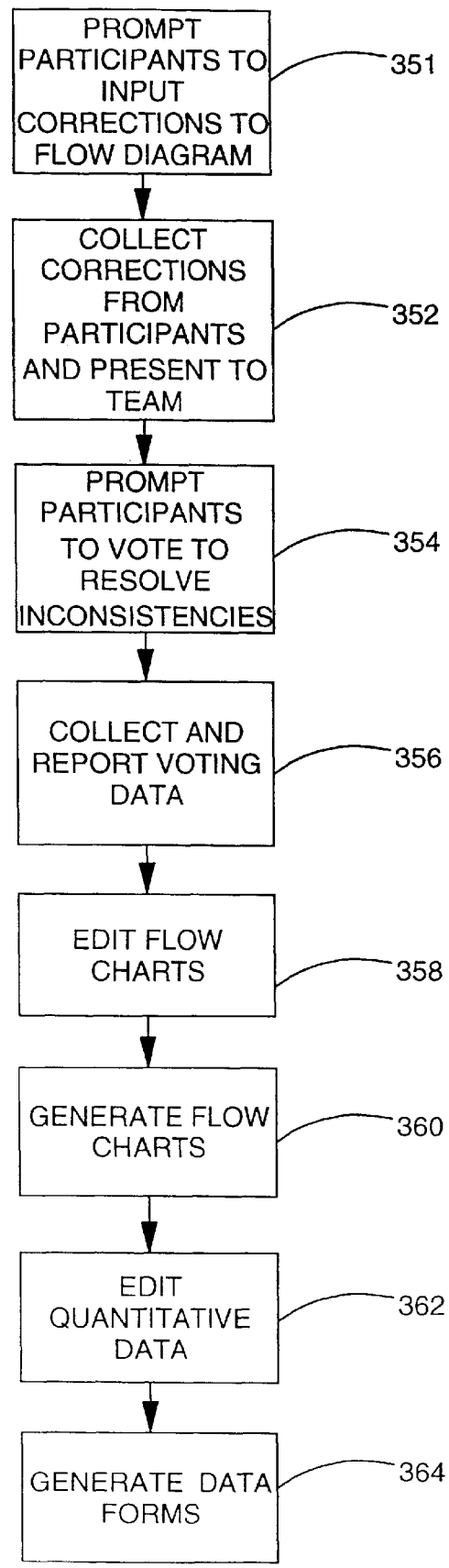

FIG. 6 shows steps which are repeated in one or more group meetings until all the flow diagrams and data sheets are correct and verified. In step 350, the participants are prompted for corrections to the flow diagrams and data forms. This may be done verbally by the facilitator or electronically or both. In step 352, correction input is automatically collected from each participant, and automatically presented to the facilitator and to all the participants. Again preferably the correction input is anonymously presented and displayed on a large group display and optionally on each workstation. In step 354, the participants are prompted to vote in order to verify or reach consensus on inconsistencies between input corrections. Step 354 is usually performed by the facilitator. In case consensus is not easily reached, the participants can be asked to vote electronically. In such a case, in step 356, voting data is automatically collected and results are automatically reported to the facilitator and preferably automatically reported to all the participants.

In step 358, the flow chart input files are edited to correct process steps and relations between process steps. In step 360 process flow diagrams are automatically generated from the flow diagram input files, the flow charts are presented to the participants.

In step 362 the files of the second database are edited to correct quantitative data. In step 364, data forms are automatically generated from the files of the second computer database for respective process steps showing the quantitative data for each process step. Finally the data forms are presented to the participants.

Figure 7A:
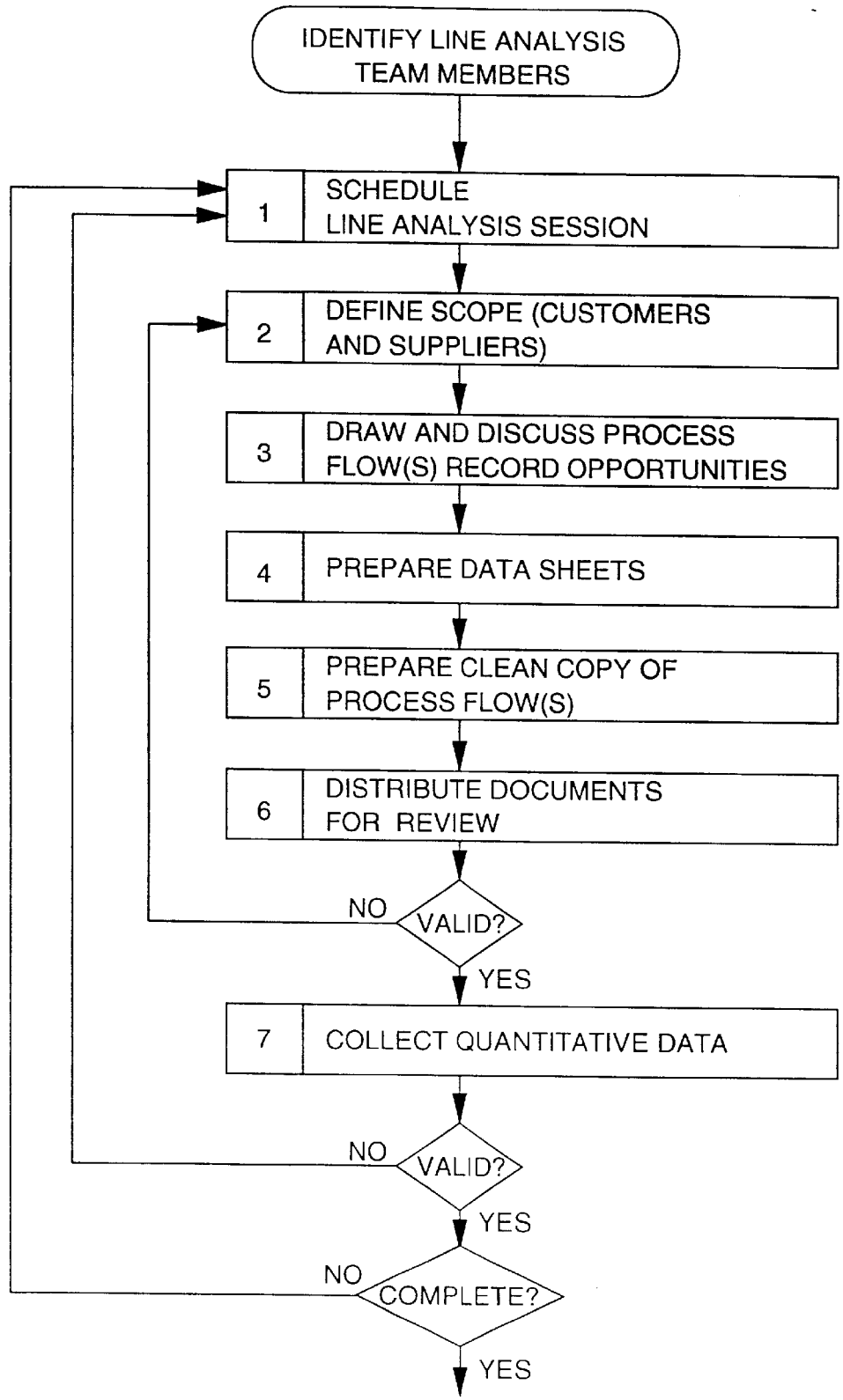
FIGS. 7A, 7B, 8A and 8B are flow diagrams illustrating a more efficient collection and organization of data, as an aid in describing further details of the invention.
Figure 7B:
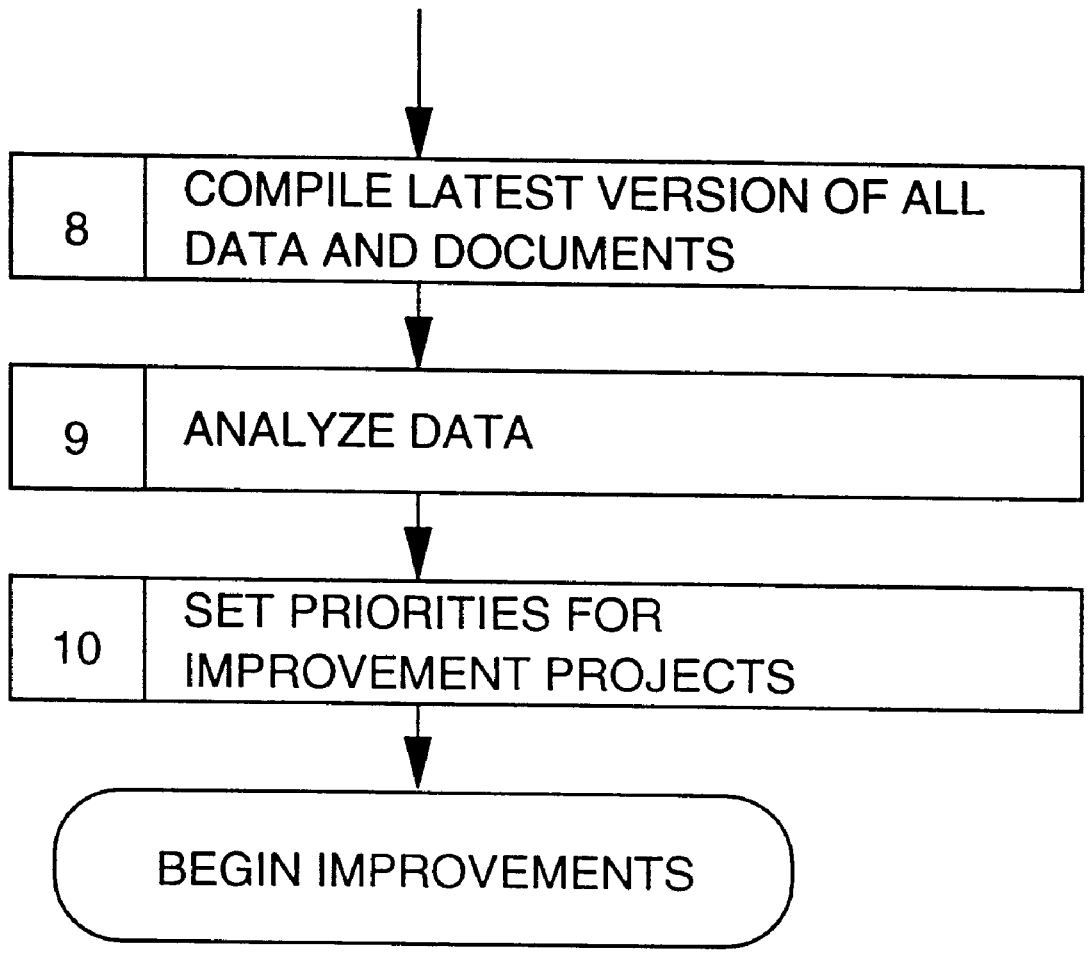
Figure 8A:
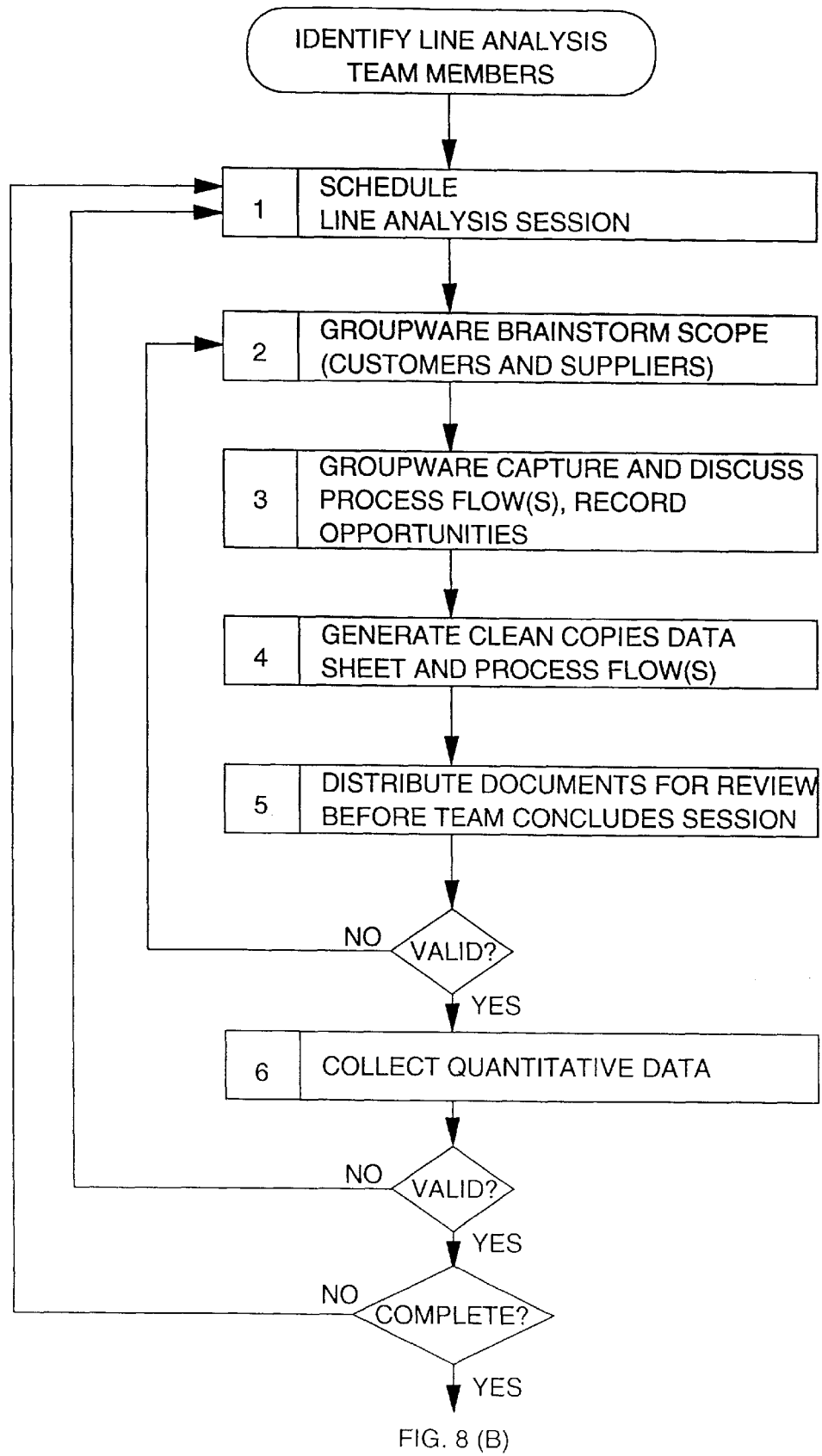
Figure 8B:
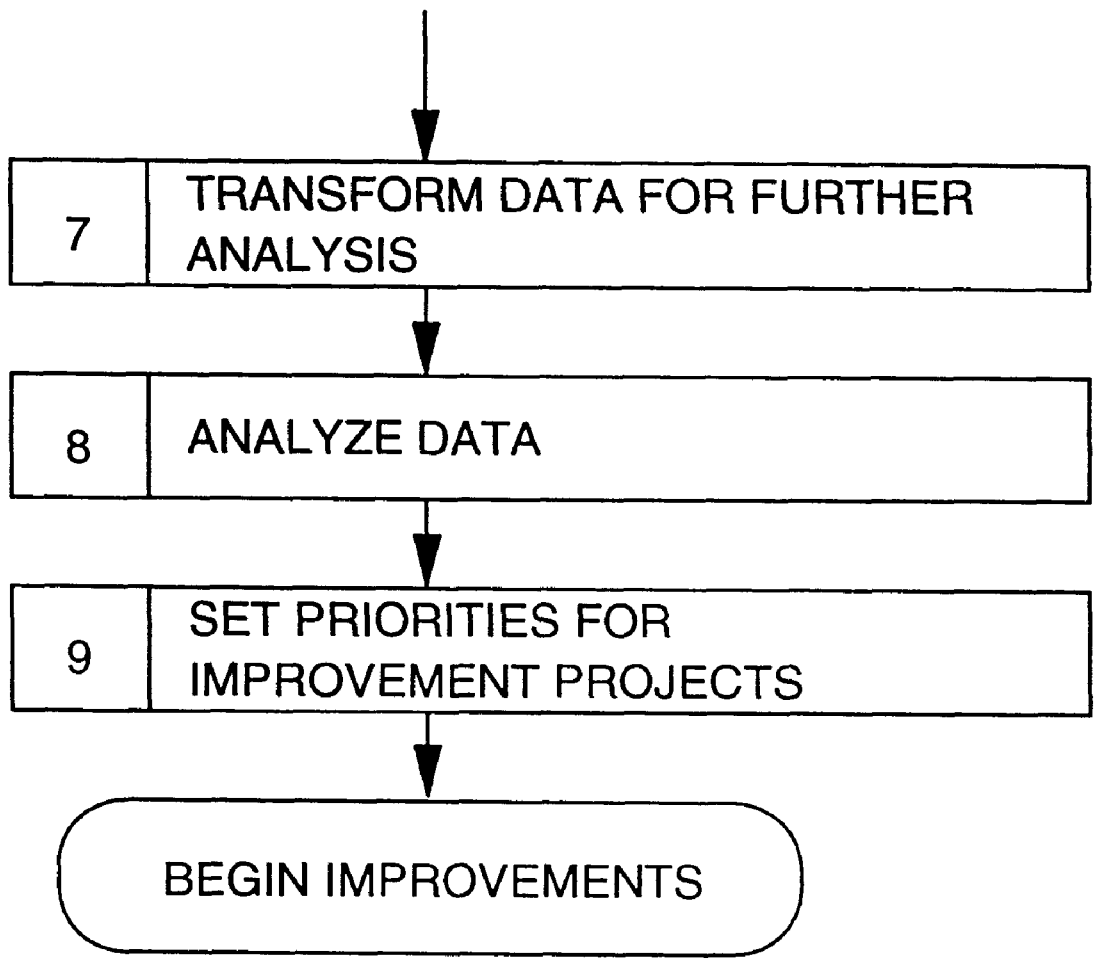

This invention, as seen in FIGS. 7a and 7b, provides a more efficient means to collect and organize the data captured during Continuous Flow Manufacturing (CFM) line analysis session and a process to transform the data into a format usable by existing database, flow charting, and analysis software tools. (See also FIGS. 8a and 8b) The fundamental approach and goals of the CFM line analysis session (1) are identical to the traditional approach. However, the Scope (2) and Process Flow and Opportunities (3) are now collected using a group ware tool. In Step (4), bridge programs custom written with an understanding of both the group ware tool data formats and CFM line analysis transform the group ware data and generate Data Sheets, Process Flow chart(s), and Opportunity Tables (4) automatically. Instead of waiting days or weeks for distribution of documents, the Line Analysis team leaves the session ready to start working immediately on document review and validation (5), then to data collection (6). With the data sheets in hand, the data collection effort (6) can be planned accurately and executed efficiently. Specific assignments can be made at the meeting wrap-up. Target completion dates can be set, and a review meeting can be scheduled. The validation loops may still be needed; however, the use of group ware tools and specialized bridge programs drastically reduces the likelihood of finding invalid or incomplete data, saving time previously wasted in revisiting earlier steps. Based on the requirements for CFM line analysis and an understanding of the data formats used by the target software tools, specialized bridge programs may be written to transform the CFM line analysis data (7) into other useful formats such as:

Text
Potential text software includes word processing, desktop publishing, database or electronic mail.
Graphics
Potential graphics software includes flow charting, presentation graphics, and Computer Aided Design and Drafting.

Analysis

Potential analysis software includes spreadsheets, statistical analysis, discrete event simulation, optimization by linear programming, and finite capacity scheduling. Any of these functions may be performed by existing software packages. Finally, the insights obtained from Analysis of the Data (8) can be used to prioritize the opportunities (9) previously generated.

The approach to CFM line analysis described here is being used successfully in IBM. IBM's group ware product, TeamFocus®, is used in facilitated work sessions for CFM line analysis. TeamFocus® is a group ware product that provides group decision support functions such as:

Electronic Brainstorming
Idea Organization
Voting
Topic Commenting
Alternative Evaluation
Group Outlining
Group Writing
Group Matrix Following the facilitated sessions the resulting data is stored in a database tool such as Microsoft Access or in another group ware tool such as LotusNotes®, thus making the data available for use in other steps in the CFM line analysis process. The documents are produced using a graphics presentation program, such as allCLEAR and a word processor, such as IBM BookMaster.

Scope Exercise

This initial facilitated session takes the line analysis team through a series of exercises that are designed to give them a common understanding of the scope of the CFM line analysis project. It takes them through some basic definitions and brainstorming exercises that done in order to get started. The definitions and ideas come directly from the group, in their own words, and are stored. Their responses are organization-specific.

Figure 9:
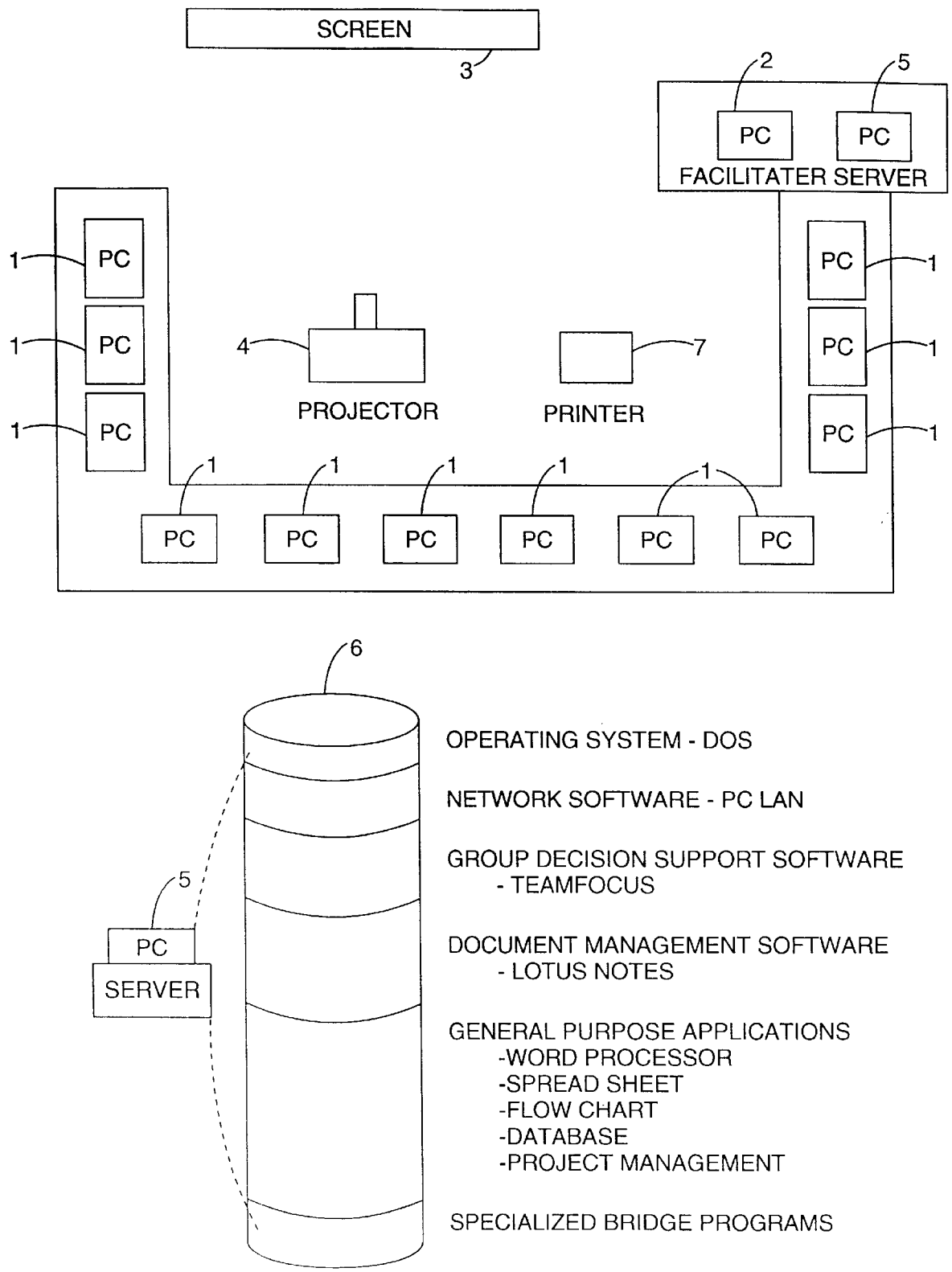
FIG. 9 shows a workgroup session gathered to perform in accordance with the invention.

Referring to FIG. 9, the workgroup gathers in a joint meeting to provide input in response to questions provided by a facilitator, shown as a PC (2) in FIG. 9. The PC server (5), operating system (6) and applications (6) are also shown. The session can also include a projector (4) and screen (3) for viewing and a printer (7) for hard copy output. Each workgroup member participates in the meeting via a PC (1) and the questions and answers may be selectively displayed on the screen or on each PC.

Alternative Embodiments

Though line analysis was developed specifically to study and improve manufacturing operations, these methods need not be limited to physical production of goods. A medical office or hospital emergency room, for example, consists of inputs, processes performed by people or machines, and outputs. Medical services can be analyzed and improved using CFM line analysis. The only difference would be that the session teams will use different terms to describe similar problems such as "How long does it take", "how many can we handle in a day?", and "how long will they have to wait?"

The groupware tools and software applications (excluding the bridge programs) identified in the preceding description of the invention are well known articles of commerce, and are not described in any further detail than that included here.

It will be appreciated that, although specific embodiments of the invention have been described herein for purposes of illustration, various modifications may be made without departing from the spirit and scope of the invention. Accordingly, the scope of protection of this invention is limited only be the following claims and their equivalents.

What is claimed is:

1. Apparatus for analyzing a system of continuous processes lines, comprising:

a facilitator workstation with a facilitator display and data input means;

multiple participant workstations with participant displays and data input means and each participant workstation having means to control the functions of the workstation;

means to produce textual and graphical output;

team display means to communicate with the facilitator workstation and having a sufficiently large screen for viewing an image with several thousand characters of text from a plurality of participant workstations;

network means for communication between the facilitator workstation, the means to produce textual and graphical output, and a plurality of the participant workstations;

automatic means to control communication between the facilitator workstation, the means to produce textual and graphical output, and a plurality of the participant workstations and to control the functions of the facilitator workstation;

team decision support means to automatically collect data from a plurality of participant workstations and display the received data to a plurality of participants, and to provide for revising the data to resolve any inconsistencies in the received data;

database means for storing and retrieving data;

means for categorizing and organizing the data collected by the team decision support means and transmitting the organized data to the database means;

bridge means, including:
  means for moving data from the database means, for further organizing the data and for transferring the further organized data to the means to produce textual and graphical output, and including:
    means for creating data sheets from the database including means to report qualitative and quantitative data for a plurality of the process steps;
    means for producing a graphical flow diagram of the process from the database, including a representation of multiple process steps and the relationships between process steps;

the database means for storing and retrieving information, including;
  means for storing and retrieving multiple process steps of multiple process lines;
  means for storing and retrieving qualitative descriptions related to each respective process step, including:
    a classification indicating the step is either an operation, transportation, inventory storage, or inspection step; and material inputs and product outputs of each operation step;
  means for storing and retrieving quantitative information related to each process step including operation time, capacity, and transportation time;
  means for storing and retrieving the relationship between the process steps; and
  means for storing and retrieving the relationship between each process line, and between each suppler and customer for that line.

2. The apparatus of claim 1, in which the means for creating data sheets includes:

data sheet database means for storing and retrieving input data for creating data sheets;

means to retrieve input data from the data sheet database means, and to report a sequence of multiple process steps, and to report quantitative data for a plurality of the process steps, including:
means to report an operation time for a process step;
means to report capacity for a process step; and
means to report a transportation time for a process step; and means to edit the data sheet input data in the data sheet database means for making revised data sheets without revising the input data in the first database means.

3. A method of analyzing a continuous flow process in a team meeting, comprising the steps of:

prompting participants in a team meeting to input data into multiple participant workstations regarding each step in the process;

inputting the data into the participant workstations;

automatically collecting input data from the participant workstations in the meeting at the facilitator workstation through a computer network;

automatically displaying the input data on a large screen to a plurality of the participants;

prompting participants to verify the accuracy of the input data and reach consensus about inconsistencies in the input data in the meeting;

organizing the data and building a computer database in the meeting;

automatically generating a process flow diagram from the database in the meeting, showing process steps and relationship between process steps;

automatically generating data forms for respective process steps from the database in the meeting, showing the quantitative data for each process step;

the step of prompting participants in a team meeting includes the step of requesting qualitative descriptions of each respective process step.

4. The method of claim 3 in which the step of prompting participants in a team meeting includes the step of requesting relationships of each step to other process steps.

5. The method of claim 3 in which the step of prompting participants in a team meeting includes the step of requesting classification of each process step as an operation, transportation, inventory storage, or inspection step.

6. The method of claim 3 in which the step of prompting participants in a team meeting includes the step of requesting material inputs and product outputs of each respective step.

7. The method of claim 3 in which the step of prompting participants during the team meeting includes the step of requesting qualitative information regarding each respective step including operation time, capacity, transition time, reliability, and availability.

8. The method of claim 3 in which the step of prompting participants during the team meeting includes the step of requesting relationship between each process line and suppliers and customers for the line.

\* \* \* \* \*